(12) United States Patent
Matsushita

(10) Patent No.: US 12,711,735 B2
(45) Date of Patent: Aug. 18, 2026

(54) IMAGE RECOGNITION APPARATUS, TRAINING APPARATUS, CONTROL METHOD, AND STORAGE MEDIUM

(71) Applicant: CANON KABUSHIKI KAISHA, Tokyo (JP)

(72) Inventor: Masahiro Matsushita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 18/407,840

(22) Filed: Jan. 9, 2024

(65) Prior Publication Data

US 2024/0242476 A1 Jul. 18, 2024

(30) Foreign Application Priority Data

Jan. 13, 2023 (JP) ................................. 2023-003679

(51) Int. Cl.
*G06V 10/74* (2022.01)
*G06V 10/62* (2022.01)
(Continued)

(52) U.S. Cl.
CPC ............ *G06V 10/761* (2022.01); *G06V 10/62* (2022.01); *G06V 10/774* (2022.01); *G06V 20/52* (2022.01); *G06V 40/168* (2022.01); *G06V 40/172* (2022.01)

(58) Field of Classification Search
CPC .... G06V 10/761; G06V 10/62; G06V 10/774; G06V 20/52; G06V 40/168; G06V 40/172; G06V 10/764; G06V 10/82
See application file for complete search history.

(56) References Cited

U.S. PATENT DOCUMENTS 11,881,052 B2 * 1/2024 Chen ..................... G06F 16/583
12,254,715 B2 * 3/2025 Chai .................... G06V 10/774
(Continued)

FOREIGN PATENT DOCUMENTS

JP 2002373332 A 12/2002
JP 2019096146 A 6/2019

OTHER PUBLICATIONS

Daniel Heinsohn, Esteban Villalobos, Loreto Prieto, Domingo Mery, “Face recognition in low-quality images using adaptive sparse representations,” Image and Vision Computing, vol. 85, 2019, pp. 46-58; ISSN 0262-8856, https://doi.org/10.1016/j.imavis.2019.02.012. (Year: 2019).*

(Continued)

*Primary Examiner* — Wesley J Tucker
(74) *Attorney, Agent, or Firm* — Canon U.S.A., Inc., IP Division

(57) ABSTRACT

An image recognition apparatus that identifies an object in an image includes at least one memory storing instructions, and at least one processor that, upon execution of the instructions, operates as a first calculation unit configured to calculate a first feature vector from a first image including the object by using a first model, a second calculation unit configured to calculate a second feature vector from second images by using a second model, wherein a number of the second images is greater than a number of the first image used by the first calculation unit, and wherein a quality of at least one of the second images is lower than the first image, and an identification unit configured to compare the first feature vector and the second feature vector to determine if an object in the second images is a same object as an object in the first image.

13 Claims, 13 Drawing Sheets

(51) Int. Cl.
*G06V 10/774* (2022.01)
*G06V 20/52* (2022.01)
*G06V 40/16* (2022.01)

(56) References Cited

U.S. PATENT DOCUMENTS

| | | | | |
|---|---|---|---|---|
| 2009/0196467 | A1* | 8/2009 | Okubo | G06V 10/772 382/118 |
| 2014/0140583 | A1* | 5/2014 | Yano | G06V 10/758 382/118 |
| 2017/0098119 | A1* | 4/2017 | Gope | G06T 7/246 |
| 2018/0089803 | A1* | 3/2018 | Zhang | G06V 10/82 |
| 2022/0101629 | A1* | 3/2022 | Liu | G06V 20/46 |
| 2023/0067730 | A1* | 3/2023 | Nakamura | G06V 40/172 |
| 2023/0386252 | A1* | 11/2023 | Kim | G06T 3/40 |
| 2023/0419721 | A1* | 12/2023 | Lee | G06T 5/70 |
| 2024/0047492 | A1* | 2/2024 | Yoon | H10K 59/1201 |
| 2024/0071134 | A1* | 2/2024 | Lee | G06V 10/7715 |
| 2024/0087364 | A1* | 3/2024 | Tate | G06V 10/454 |
| 2024/0161237 | A1* | 5/2024 | Han | G06V 10/82 |
| 2024/0220535 | A1* | 7/2024 | Sanagavarapu | G06V 10/56 |
| 2025/0047492 | A1* | 2/2025 | Sreehari | G06V 40/172 |

OTHER PUBLICATIONS

Erfan Zangeneh, Mohammad Rahmati, Yalda Mohsenzadeh, “Low resolution face recognition using a two-branch deep convolutional neural network architecture,” Expert Systems with Applications, vol. 139, 2020; 112854, ISSN 0957-4174, https://doi.org/10.1016/j.eswa.2019.112854. (Year: 2020).*

* cited by examiner 100
104
EXTERNAL STORAGE DEVICE
301
REGISTERED IMAGE
201
OBJECT DETECTION UNIT
302
OBJECT REGION
203
SELECTION UNIT
204
FIRST FEATURE VECTOR CALCULATION UNIT
205
SECOND FEATURE VECTOR CALCULATION UNIT
303
FEATURE VECTOR
206
FEATURE VECTOR REGISTRATION UNIT
104
EXTERNAL STORAGE DEVICE 112
IMAGING APPARATUS
501
MONITORING VIDEO IMAGE
100
107
COMMUNICATION I/F
201
OBJECT DETECTION UNIT
202
TRACKING UNIT
502
OBJECT REGION
203
SELECTION UNIT
204
FIRST FEATURE VECTOR CALCULATION UNIT
205
SECOND FEATURE VECTOR CALCULATION UNIT
104
EXTERNAL STORAGE DEVICE
503
FEATURE VECTOR
504
REGISTERED FEATURE VECTORS
207
IDENTIFICATION UNIT
505
IDENTIFICATION RESULT
106
OUTPUT I/F
110
MONITOR START
S601
ACQUIRE VIDEO IMAGE
S602
DETECT OBJECT
S603
TRACK OBJECT
S604
NUMBER OF OBJECT REGIONS = 1?
NO
YES
S1101
CALCULATE SECOND A FEATURE VECTORS
S1102
INTEGRATE SECOND A FEATURE VECTORS
S1103
CALCULATE FEATURE VECTOR
S605
CALCULATE FEATURE VECTOR
S607
ACQUIRE REGISTERED FEATURE VECTORS
S608
PERFORM IDENTIFICATION
S609
OUTPUT RESULT
END 12A
1201
1202
CNN UNIT
1203
SECOND A FEATURE VECTOR
1204
FULLY-CONNECTED LAYER
1205
CLASSIFICATION PROBABILITY
1206
WEIGHT UPDATE UNIT
12061
LOSS FUNCTION
707
GROUND TRUTH DATA
12B
1211
12111
12112
1202
CNN UNIT
1202
CNN UNIT
12131
12132
SECOND A FEATURE VECTOR
1214
INTEGRATION UNIT
1215
INTEGRATED FEATURE VECTOR
1216
CNN UNIT
1217
FEATURE VECTOR
704
FULLY-CONNECTED LAYER
1218
CLASSIFICATION PROBABILITY
1219
WEIGHT UPDATE UNIT
12191
LOSS FUNCTION
707
GROUND TRUTH DATA

IMAGE RECOGNITION APPARATUS, TRAINING APPARATUS, CONTROL METHOD, AND STORAGE MEDIUM

BACKGROUND

Technical Field

The present disclosure relates to an image recognition method.

Description of the Related Art

In recent years, products that perform object recognition, such as person recognition and face recognition, using deep learning as algorithms in the artificial intelligence (AI) field have been increasing. For example, a monitoring camera system recognizes who is a captured person among registered persons, and an entrance and exit management system recognizes who is inside a facility by performing face authentication at an entrance and exit gate.

Such systems extract a feature vector from an input image of a person and compare the extracted feature vector with feature vectors of a large number of registered persons. The systems then perform identification processing by identifying the registered person having the most similar feature vector as the person captured in the input image. In the identification processing, the degree of similarity between each of the feature vectors of the registered persons and the feature vector acquired from the input image is calculated as collation processing.

To register persons in advance, a face authentication apparatus in the entrance and exit management system uses high-quality images like identification photographs in each of which a person's face is facing forward, the face is stationary without motion blur, the face is in focus, and the resolution is high. In contrast, at the entrance and exit gate and the like, low-quality images, such as video images captured by a monitoring camera, are used as comparison images. Is such low-quality images, for example, a person's face is facing sideways, a person is facing downward, a person is moving and blurred, a person's face is out of focus and blurred, and the resolution is low. For this reason, features of persons cannot be correctly extracted from the above-described low-quality images, and the low-quality images may not be correctly collated against the above-described high-quality images. To address such an issue, Japanese Patent Application Laid-Open No. 2019-96146 discusses a technique of increasing the resolution of a low-resolution face image to generate a high-resolution face image and performing face authentication with high accuracy.

With the technique discussed in Japanese Patent Application Laid-Open No. 2019-96146, when a high-resolution face image is generated from a low-resolution face image, information not found in the original image may be added. As a result, correct collation may not be performed to cause erroneous authentication.

SUMMARY

According to an aspect of the present disclosure, an image recognition apparatus that identifies an object in an image includes at least one memory storing instructions, and at least one processor that, upon execution of the instructions, is configured to operate as a first calculation unit configured to calculate a first feature vector from a first image including the object by using a first model, a second calculation unit configured to calculate a second feature vector from second images by using a second model, wherein a number of the second images is greater than a number of the first image used by the first calculation unit, and wherein a quality of at least one of the second images is lower than the first image, and an identification unit configured to compare the first feature vector and the second feature vector to determine if an object in the second image is a same object as an object in the first image.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. In the following, an image recognition apparatus that performs face recognition will be described as an example of an image processing apparatus.

Figure 1:
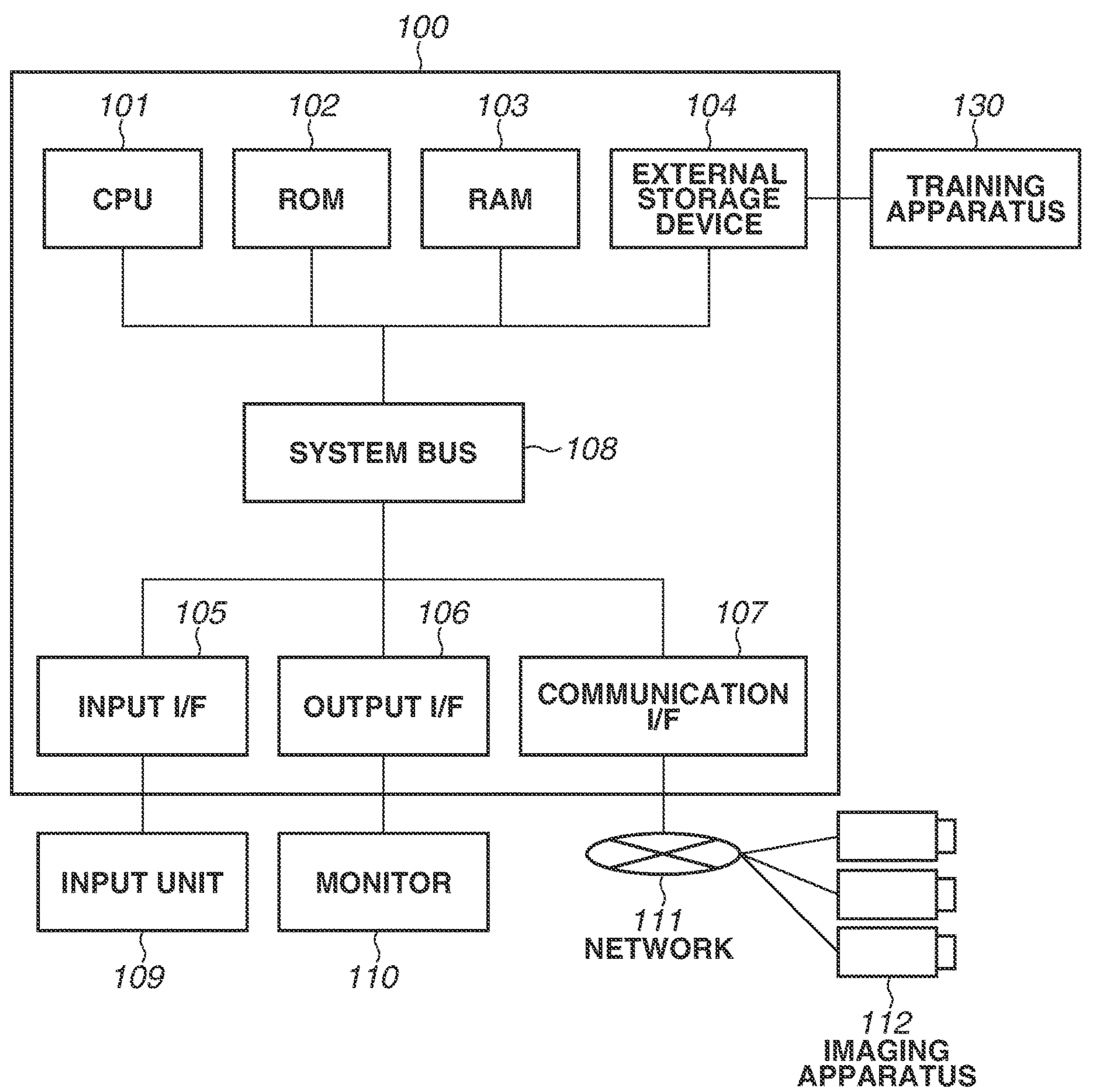
FIG. 1 is a diagram illustrating an example of an entire configuration of a monitoring system and an example of a hardware configuration of an image processing apparatus according to an exemplary embodiment.

FIG. 1 is a diagram illustrating an example of an entire configuration of a monitoring system and an example of a hardware configuration of an image processing apparatus 100 according to a first exemplary embodiment of the present disclosure. The monitoring system includes the image processing apparatus 100 and imaging apparatuses 112 as imaging units, and identifies persons captured by the imaging apparatuses 112. FIG. 1 illustrates a case where the monitoring system includes three imaging apparatuses 112, but the number of imaging apparatuses 112 is not limited thereto. The image processing apparatus 100 and the imaging apparatuses 112 are connected to each other via a network 111. A training apparatus 130 is also connected to the image processing apparatus 100 via an external storage device 104. The training apparatus 130 performs training for a trained model to be used by the image processing apparatus 100, and has a hardware configuration similar to a hardware configuration of the image processing apparatus 100 (described below). It is unnecessary to include the training apparatus 130 in the monitoring system at the time of executing the monitoring system, and the training apparatus 130 is just used for preparation of the trained model. The image processing apparatus 100 may include a training unit in place of the training apparatus 130. In a case where the image processing apparatus 100 includes the training unit or in a case where the training apparatus 130 is included in the monitoring system, functional improvements can be achieved by training based on images captured in real time. In a case where the monitoring system does not include a training function, the system can be saved.

A central processing unit (CPU) 101 controls the entire operation of the image processing apparatus 100. A read only memory (ROM) 102 stores programs and parameters not to be changed. A random-access memory (RAM) 103 temporarily stores programs and data supplied from an external apparatus and the like. The external storage device 104 is, for example, a hard disk drive or a memory card and is fixedly installed at the image processing apparatus 100. Examples of the external storage device 104 may include a flexible disk (FD), an optical disc such as a compact disc (CD), a magnetic or optical card, an integrated circuit (IC) card, and a memory card, which are detachably attached to the image processing apparatus 100. The functions and processing of the image processing apparatus 100 (described below) are implemented by the CPU 101 reading out programs stored in the ROM 102 and the external storage device 104 and executing the programs.

An input interface (I/F) 105 is used to receive information from an input unit 109, such as a pointing device or a keyboard, that is configured to receive a user operation and input data. An output I/F 106 is used to connect to a monitor 110 that displays data held by the image processing apparatus 100 and data supplied thereto. A communication I/F 107 is used to connect to the network 111 such as the Internet. The imaging apparatuses 112 are cameras such as monitoring cameras and are connected to the image processing apparatus 100 via the network 111. A system bus 108 is a transmission path via which the above-described components are communicably connected to each other.

Figure 2:
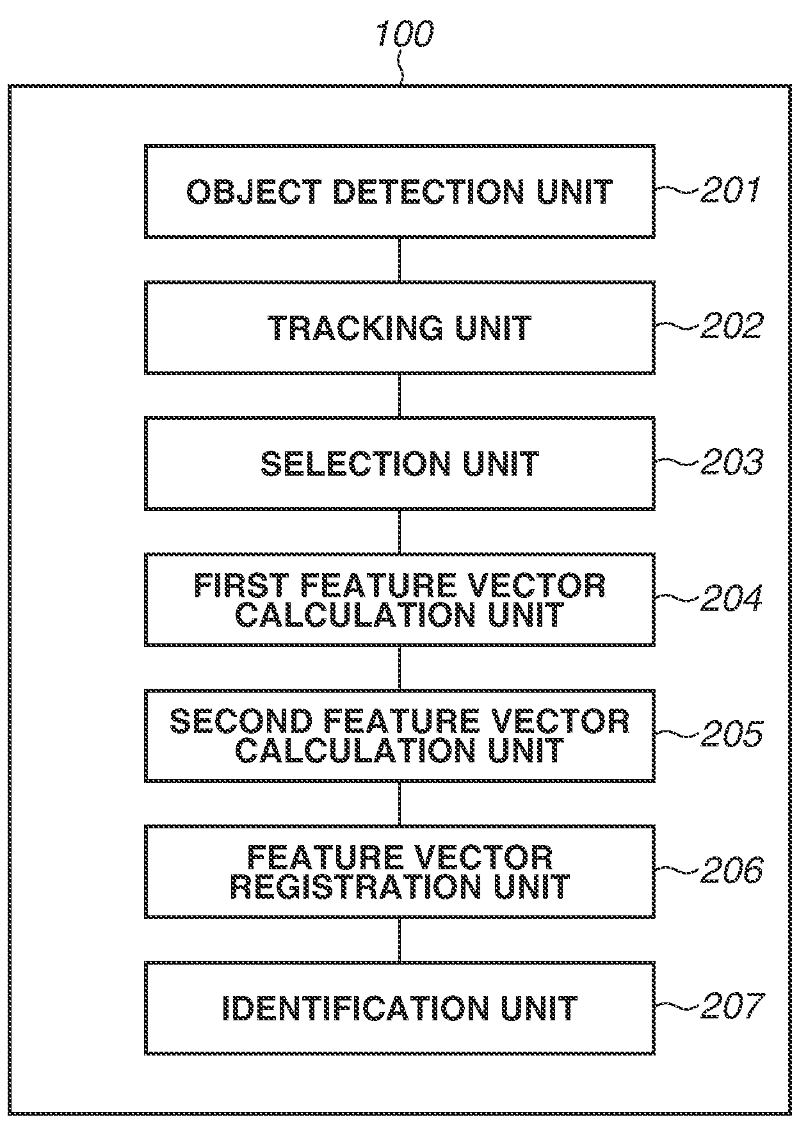
FIG. 2 is a block diagram illustrating an example of a functional configuration of an image processing apparatus according to a first exemplary embodiment.

FIG. 2 is a block diagram illustrating an example of a functional configuration of the image processing apparatus 100 according to the present exemplary embodiment.

Figure 3:
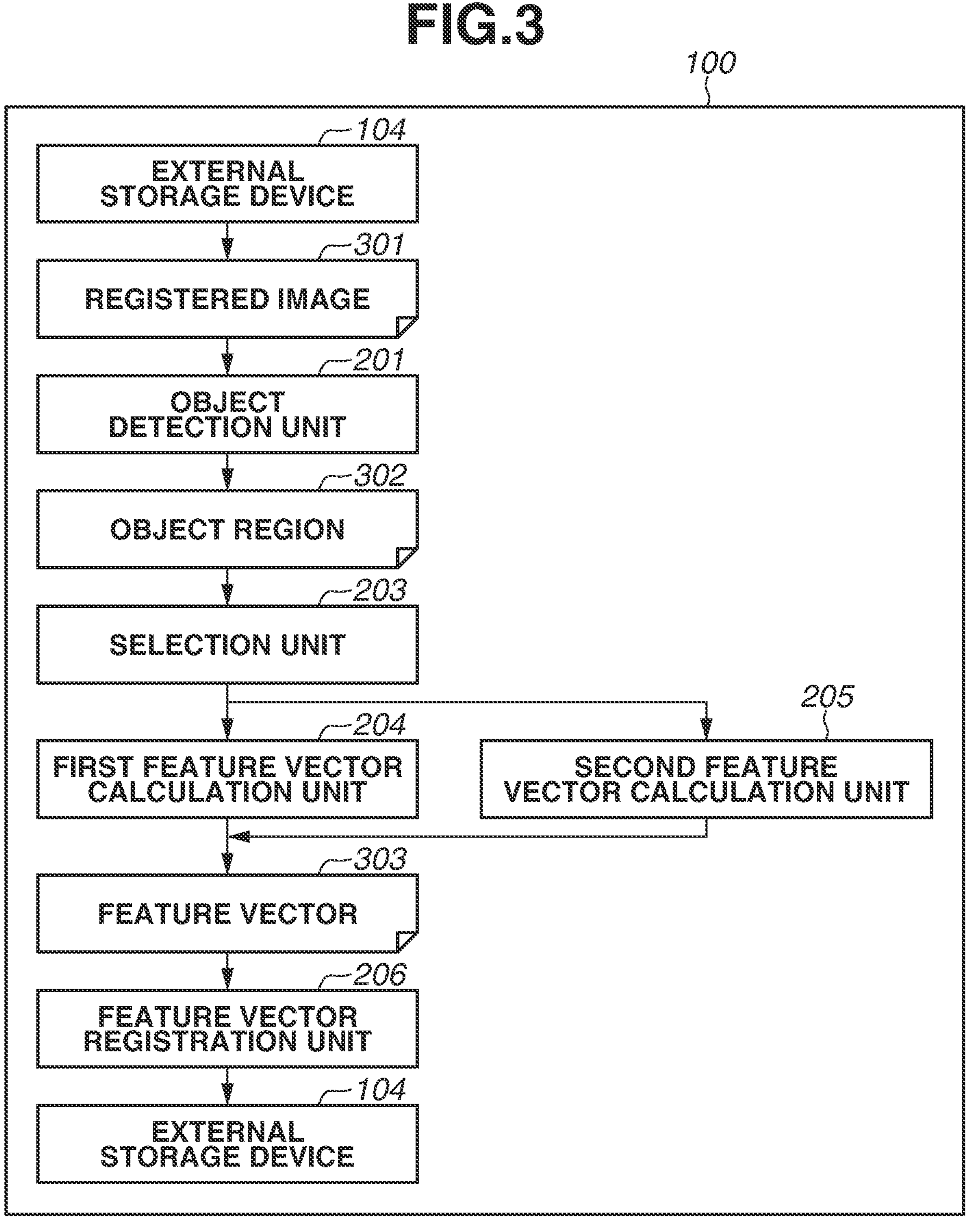
FIG. 3 is a diagram illustrating a procedure for feature vector registration processing.

FIG. 3 is a diagram illustrating a procedure for feature vector registration processing performed by the image processing apparatus 100 according to the present exemplary embodiment. The feature vector registration processing is processing in which a person to be identified is registered, and is performed in order to detect in identification processing whether the registered person has been captured by any of the imaging apparatuses 112. As illustrated in FIG. 2, the image processing apparatus 100 includes an object detection unit 201, a tracking unit 202, a selection unit 203, a first feature vector calculation unit 204, a second feature vector calculation unit 205, a feature vector registration unit 206, and an identification unit 207. First, processing performed by the above-described units of the image processing apparatus 100 in order to perform the feature vector registration processing will be described with reference to FIG. 3.

In the feature vector registration processing by the image processing apparatus 100, the user first operates the input unit 109 to select an image as a registered image 301 from the external storage device 104. In the present exemplary embodiment, one or two images are registered as the registered image(s) 301. The registered image 301 is an image of a person to which the user desires to apply identification processing in order to detect whether the person has been captured by any of the imaging apparatuses 112. Thus, the registered image 301 is desirably a high-quality image in which features of the person are clearly captured. The quality used herein indicates total quality in terms of image quality, such as resolution, out-of-focus blur, and motion blur, and in terms of the suitability of the appearances of an object (the direction, distance, etc. of an object with respect to a camera) to subsequent processing such as recognition and tracking. In the present exemplary embodiment, it is assumed that only one person is captured in one registered image 301. In a case where a plurality of persons is captured in one registered image 301, the user separately selects a person to be registered, which makes it possible to handle the registered image 301 including the plurality of persons as the registered image 301 including one person.

The object detection unit 201 analyzes all the registered images 301 to detect face regions of the person in the registered images 301, thereby acquiring information about object regions 302. In the present exemplary embodiment, the object detection unit 201 can use a face detection method with, for example, a convolutional neural network (CNN). The face region detection method used by the object detection unit 201 is not limited to the method with the CNN.

The selection unit 203 selects a unit for calculating a feature vector 303, based on the number of registered images 301, namely, the number of object regions 302. For example, in a case where the number of object regions 302 is one, the first feature vector calculation unit 204 is selected to calculate the feature vector 303. In a case where the number of object regions 302 is two, the second feature vector calculation unit 205 is selected to calculate one feature vector 303.

Feature vectors are designed to enable determining whether objects are the same, with high accuracy. Basically, in the case of face authentication, the feature vectors have similar values if the objects are the same person, whereas the feature vectors have largely different values if the objects are different persons, irrespective of facial expressions, imaging directions, and the presence or absence of illumination and accessories. However, in a case where the facial expression is largely disturbed or the face is facing sideways, i.e., the orientation of the face is largely shifted from the front, the authentication accuracy is affected. Further, in a case where the resolution of the face region is low (the number of pixels is low) or in a case where the resolution feeling is low due to motion blur or out-of-focus blur, features of the face are unable to be captured accurately, which affects the authentication accuracy.

In the present exemplary embodiment, in a case where there is a plurality of object images even though the object images may affect the authentication accuracy as described above, training is performed so as to calculate a feature vector that collects features hardly affecting the authentication accuracy from the plurality of object images. Details of a method for training a model to calculate the feature vector will be described below.

The feature vector registration unit 206 registers, in the external storage device 104, the feature vector 303 calculated by the unit selected by the selection unit 203. The feature vector 303 may be registered in another external apparatus and be transmitted via the communication I/F 107. The control programs are not limited to the control programs stored in the ROM 102, and some of the control programs may be stored in another device. For example, the object detection unit 201 may be provided in another server. The image processing apparatus 100 may include only the selection unit 203, the first feature vector calculation unit 204, and the second feature vector calculation unit 205. Further, an entire configuration for performing the feature vector registration processing may be provided in another apparatus. In the case of any of the above configurations, a hardware specification suitable for the processing is selectable.

A specific processing procedure for the above-described feature vector registration processing by the image processing apparatus 100 will be described with reference to a flowchart in FIG. 4. Processing corresponding to each step in the flowchart to be described in the present exemplary embodiment may be implemented by software using the CPU 101, or by hardware such as an electronic circuit.

Figure 4:
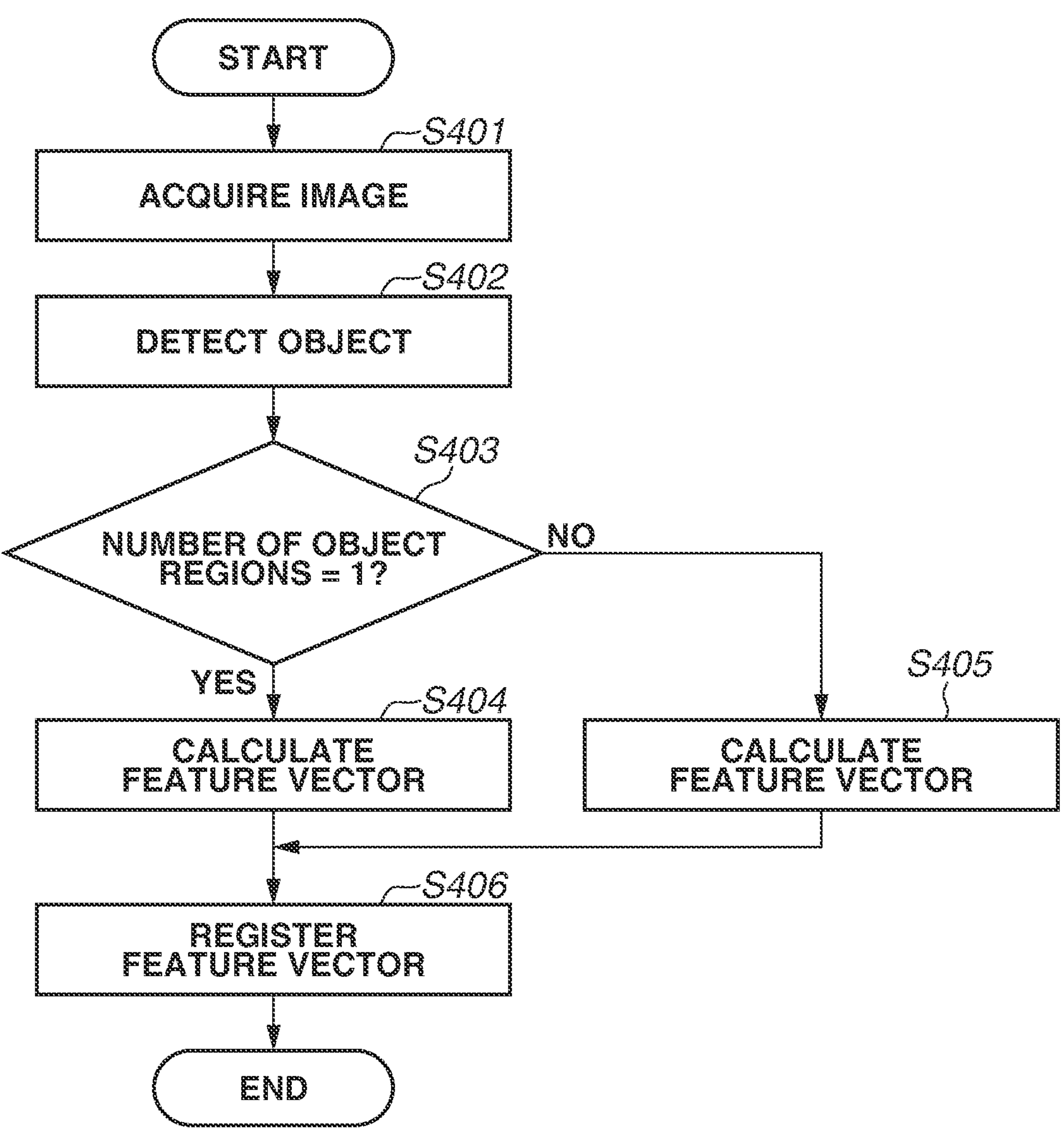
FIG. 4 is a flowchart illustrating an example of a procedure for feature vector registration processing according to the first exemplary embodiment.

FIG. 4 is a flowchart illustrating an example of the procedure for the feature vector registration processing by the image processing apparatus 100 according to the present exemplary embodiment.

In step S401, the CPU 101 of the image processing apparatus 100 acquires, from the external storage device 104, one or two registered images 301 selected by the user operating the input unit 109. At this time, the user selects one registered image 301 or two registered images 301 of the same person, but, as described above, it is assumed that only one person is captured in each registered image 301 in the present exemplary embodiment.

In step S402, the object detection unit 201 detects the face regions of the person from all the registered images 301, thereby acquiring information about the object regions 302.

In step S403, the selection unit 203 selects the unit for calculating the feature vector 303, based on the number of object regions 302. In a case where the selection unit 203 determines that the number of object regions 302 is one (YES in step S403), the processing proceeds to step S404. In step S404, the first feature vector calculation unit 204 calculates the feature vector 303. In a case where the selection unit 203 determines that the number of object regions 302 is plural (NO in step S403), the processing proceeds to step S405. In step S405, the second feature vector calculation unit 205 calculates one feature vector 303.

In step S406, the feature vector registration unit 206 registers, in the external storage device 104, the feature vector 303 calculated in step S404 or S405. The processing then ends.

Figure 5:
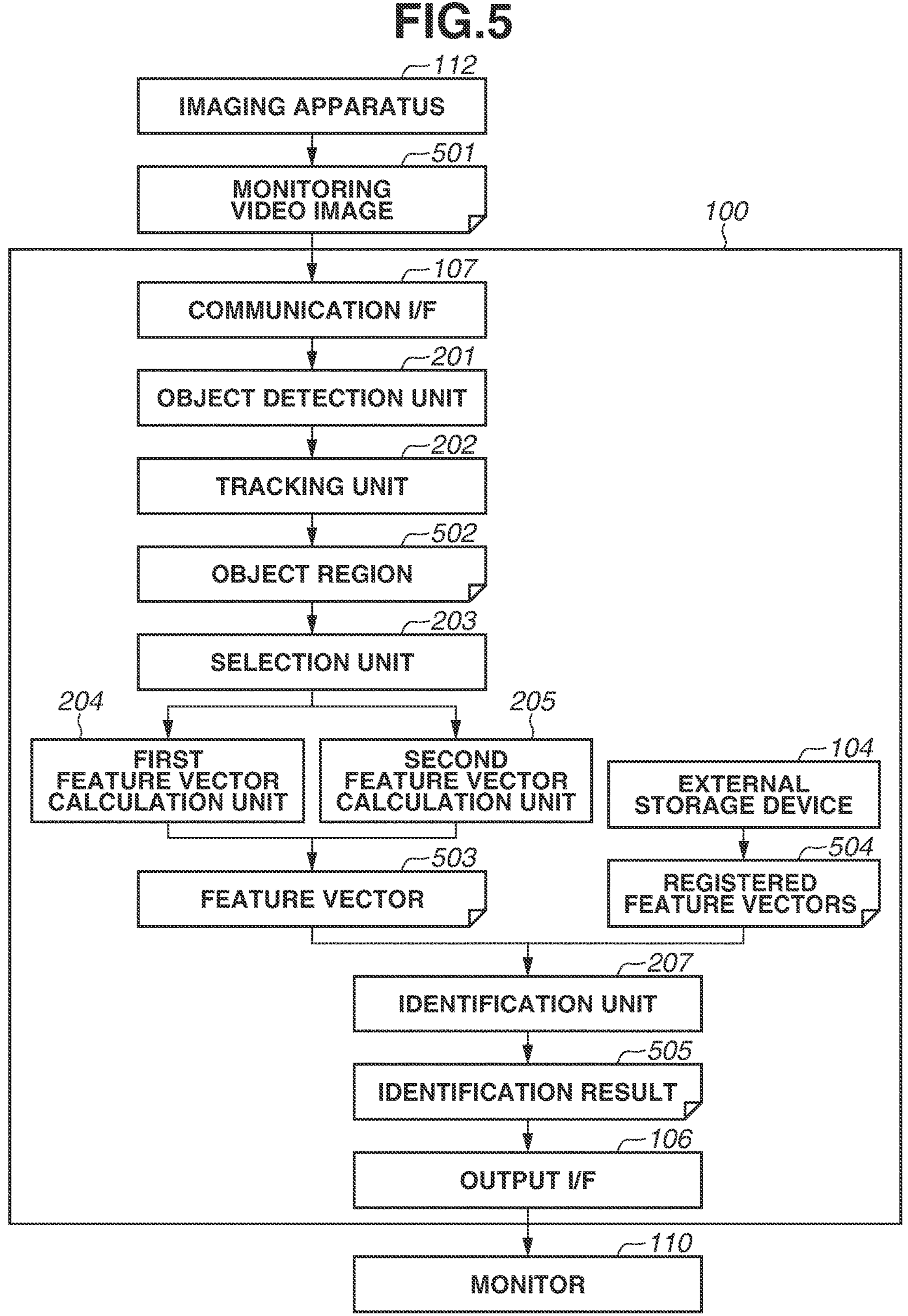
FIG. 5 is a diagram illustrating a procedure for object identification processing.

Subsequently, processing performed by the above-described units in order to perform object identification processing will be described with reference to FIGS. 2 and 5. FIG. 5 is a diagram illustrating a procedure for the object identification processing by the image processing apparatus 100 according to the present exemplary embodiment. In the example of FIG. 5, the image processing apparatus 100 according to the present exemplary embodiment acquires a monitoring video image 501 acquired by any of the imaging apparatuses 112, which are externally located, via the network 111 and the communication I/F 107. The monitoring video image 501 includes successively captured images, but the monitoring video image 501 is not particularly limited thereto.

In the object identification processing by the image processing apparatus 100, the object detection unit 201 analyzes the acquired monitoring video image 501 to detect a face region of a person captured in the monitoring video image 501.

As a method for detecting the face region, for example, the face detection method with the CNN is usable as in the feature vector registration processing, but the face detection method is not limited to the method with the CNN.

Subsequently, the tracking unit 202 tracks the person detected by the object detection unit 201 over a plurality of frames, thereby acquiring information about a plurality of the object regions 502 of the same person. The person tracking method used by the tracking unit 202 is not particularly limited. For example, a method of tracking the person by estimating a search position of the detected object in a next frame and performing template matching is used as discussed in Japanese Patent Application Laid-Open No. 2002-373332.

The selection unit 203 selects the unit for calculating a feature vector 503, based on the number of object regions 502 as in the feature vector registration processing. In a case where the number of object regions 502 is one, the first feature vector calculation unit 204 calculates the feature vector 503. In a case where the number of object regions 502 is two, the second feature vector calculation unit 205 calculates one feature vector 503.

Subsequently, the identification unit 207 reads out registered feature vectors 504 from the external storage device 104. The registered feature vectors 504 are feature vectors of objects to be identified. The identification unit 207 then performs the identification processing by comparing the feature vector 503 calculated by the first feature vector calculation unit 204 or the second feature vector calculation unit 205 with the registered feature vectors 504, thereby acquiring an identification result 505. The identification result 505 includes one of the registered feature vectors 504 that has the highest similarity with the feature vector 503 and has the similarity greater than a predetermined threshold, an image of the object, and information about a name of the object.

The identification unit 207 then displays the identification result 505 on the monitor 110 via the output I/F 106. When the identification result 505 is presented, not only displaying the detected face of the person, but also issuing an alert indicating the detection may be performed by blinking a part or a whole of the screen. Furthermore, an alert lamp (not illustrated) may be additionally provided in the monitoring system to issue an alert.

As in the feature vector registration processing, the external storage device 104 and the monitor 110 may be other external devices, and the registered feature vectors 504 and the identification result 505 may be transmitted and received via the communication I/F 107. Further, as in the feature vector registration processing, the control programs are not limited to the control programs stored in the ROM 102, and some of the control programs may be stored in another device. For example, the object detection unit 201, the tracking unit 202, the selection unit 203, the first feature vector calculation unit 204, and the second feature vector calculation unit 205 may be incorporated in each of the imaging apparatuses 112 or in another server. The image processing apparatus 100 may include only the identification unit 207. In the case of such a configuration, an apparatus for analyzing the monitoring video image 501 and an apparatus for performing the identification processing can be separated from each other, which enables selection of a hardware specification suitable for each processing.

A specific processing procedure for the above-described object identification processing by the image processing apparatus 100 will be described with reference to a flowchart in FIG. 6. Processing corresponding to each step in the flowchart to be described in the present exemplary embodiment may be implemented by software using the CPU 101, or by hardware such as an electronic circuit.

Figure 6:
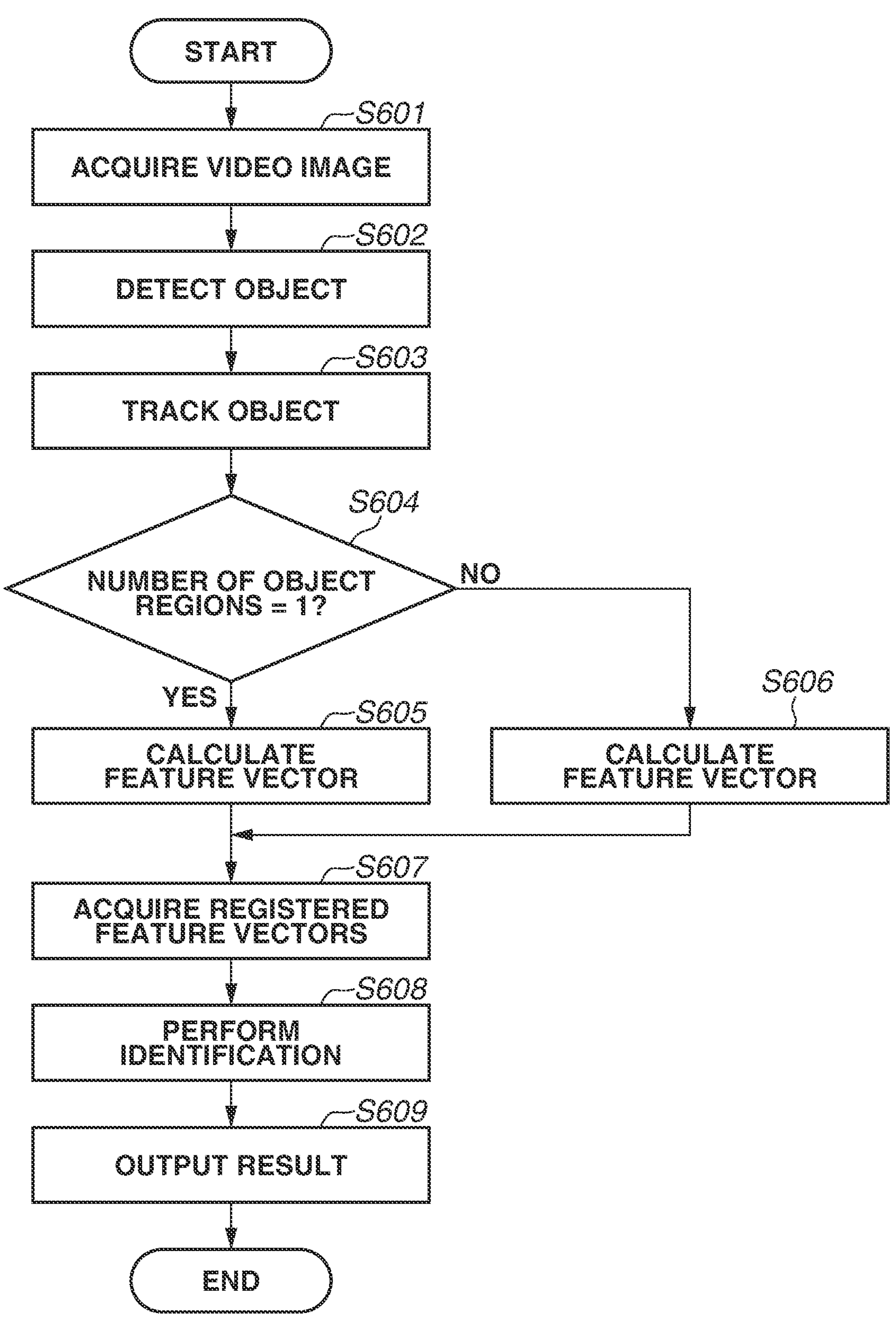
FIG. 6 is a flowchart illustrating an example of a procedure for object identification processing according to the first exemplary embodiment.

FIG. 6 is a flowchart illustrating an example of the procedure for the object identification processing by the image processing apparatus 100 according to the present exemplary embodiment.

In step S601, the CPU 101 of the image processing apparatus 100 acquires a video image from any of the imaging apparatuses 112. In step S602, the object detection unit 201 detects a face region from the video image. The example of FIG. 6 is described based on an assumption that one face region is detected. In a case where a plurality of face regions is detected, processing in subsequent steps S603 to S608 is repeated, and a description thereof will thus be omitted.

In step S603, the tracking unit 202 tracts the person detected by the object detection unit 201 over a plurality of frames, thereby acquiring information about the object regions 502 of the same person. In the present exemplary embodiment, for example, information about two object regions 502 of the same person with a predetermined interval among the plurality of frames is acquired. In step S604, the selection unit 203 selects the unit for calculating the feature vector 503, based on the number of object regions 502. In a case where the number of object regions 502 is one (YES in step S604), the processing proceeds to step S605. In step S605, the first feature vector calculation unit 204 calculates the feature vector 503. In a case where two object regions 502 are acquired from different frames as described above (NO in step S604), the processing proceeds to step S606. In step S606, the second feature vector calculation unit 205 calculates one feature vector 503.

In step S607, the identification unit 207 acquires the registered feature vectors 504 from the external storage device 104. In step S608, the identification unit 207 acquires the identification result 505 by comparing the feature vector 503 with the registered feature vectors 504. In this processing, in a case where one of the registered feature vectors 504 that has the highest similarity is determined and the highest similarity is greater than the predetermined threshold, the identification result 505 indicating that the person captured in the video image is the person having the determined registered feature vector 504 is acquired. In a case where the highest similarity is the predetermined threshold or less, a result indicating no identified person is acquired. In step S609, the identification unit 207 outputs the identification result 505. The processing then ends. In the case of no identified person, the processing ends without outputting the identification result 505.

Figure 7:
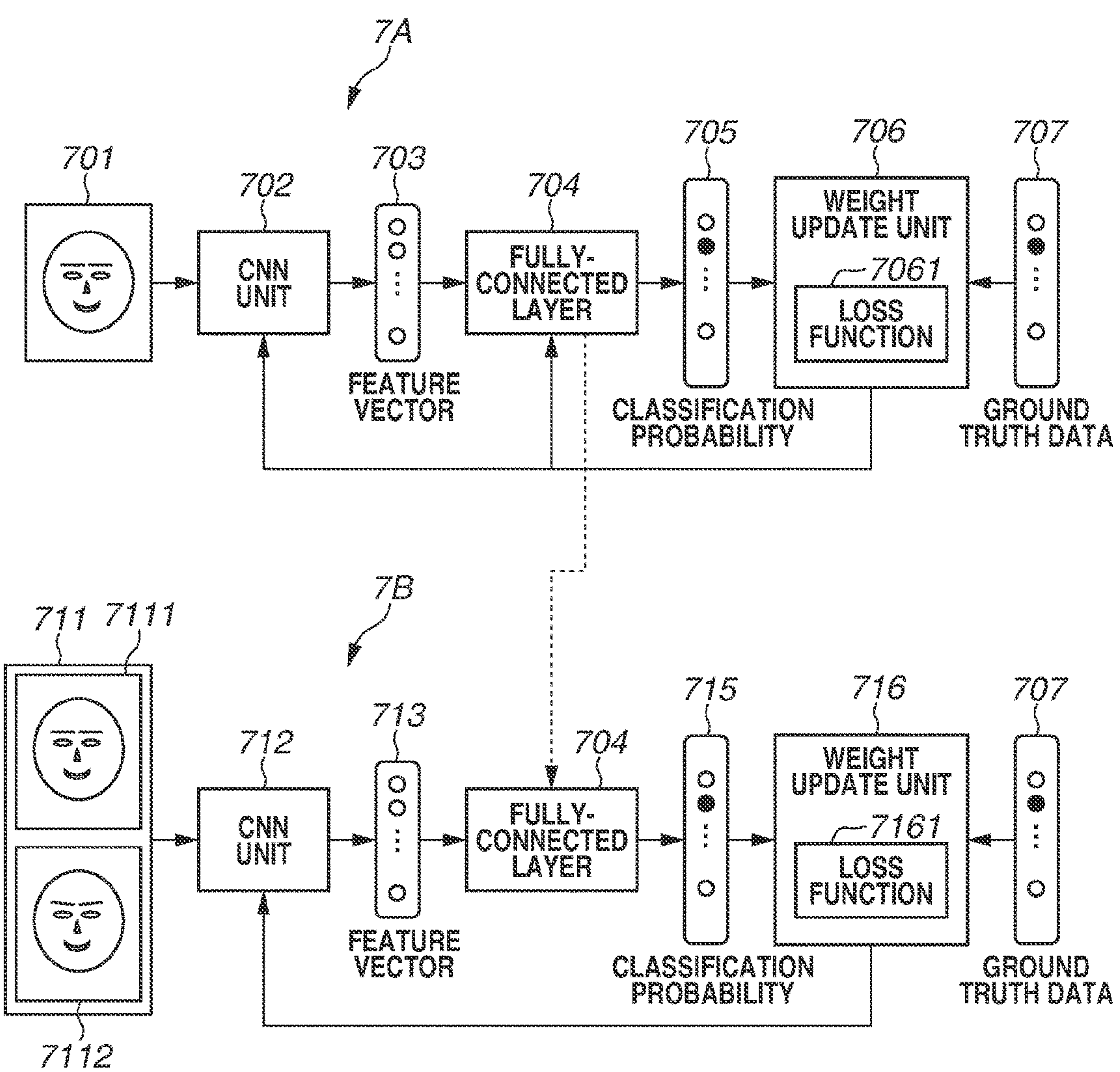
FIG. 7 is a diagram illustrating an example of training processing on first and second feature vector calculation units.

FIG. 7 is a diagram illustrating an example of training processing on the first feature vector calculation unit 204 and the second feature vector calculation unit 205. In the present exemplary embodiment, the training method used in a case where the first feature vector calculation unit 204 and the second feature vector calculation unit 205 are each formed by a deep neural network will be described. There are various methods for training the deep neural network for object identification. In the present exemplary embodiment, an ArcFace method discussed in Jiankang Deng, Jia Guo, Niannan Xue, Stefanos Zafeiriou, "ArcFace: Additive Angular Margin Loss for Deep Face Recognition", In rXiv: 1801.07698, 2018. will be described as an example.

Processing 7A in FIG. 7 is an example of when one face image 701 is used, and processing 7B in FIG. 7 is an example of when two face images 711 (face images 7111 and 7112) are used. In the present exemplary embodiment, first, in the processing 7A, models of a CNN unit 702 and a fully-connected layer 704 are simultaneously trained using one face image 701. Then, in the processing 7B, the trained fully-connected layer 704 is fixed, and a CNN unit 712 is trained using two face images 711.

The processing 7A is an example in which one face image 701 is input at a time for training, and the training is performed using a high-quality image in which features of a person are clearly captured. To enable the identification to some extent using a low-quality image, such as an image in which a person's face is not facing forward, an image with out-of-focus blur or motion blur, or a low-resolution image, the training is also performed using such an image. It is assumed that the face image 701 is normalized to a predetermined image size in advance. More specifically, in a case where the size of the original image exceeds the predetermined image size, the original image is reduced to the predetermined image size using a bicubic method or the like. In a case where the size of the original image is smaller than the predetermined image size, the original image is enlarged to the predetermined image size using the bicubic method or the like.

In the processing 7A, the face image 701 is input to the CNN unit 702 to calculate a feature vector 703. The feature vector 703 is then input to the fully-connected layer 704 to calculate a classification probability 705. Then, a weight update unit 706 calculates a loss function 7061 with a one-hot vector of ground truth data 707 for the face image 701. As the loss function 7061, cross entropy is used. Results of the loss function 7061 are compiled for each batch that is one set of training data, and parameters of the CNN unit 702 and the fully-connected layer 704 are updated using a backpropagation method. However, the loss function 7061 and the method for feedbacking the parameters are not limited to the above-described loss function and the above-described method, respectively. The CNN unit 702 trained at this time is used as the first feature vector calculation unit 204.

The processing 7B is an example in which two face images 711 (face images 7111 and 7112) are input at a time for training. In other words, the training is performed using two images of the same person. As the images to be input, images, such as an image in which the person's face is not facing forward, an image with out-of-focus blur or motion blur, and a low-resolution image, are used. In the case of training using two face images 711, the fully-connected layer 704 trained using one face image 701 is fixed, and only the CNN unit 712 is trained. It is assumed that the face images 711 are each normalized to the predetermined image size in advance as with the face image 701. However, the size of the normalized face images 711 may be smaller than the size of the normalized face image 701.

In the processing 7B, two face images 711 (face images 7111 and 7112) are connected, and the connected image is input to the CNN unit 712 to calculate a feature vector 713. The feature vector 713 is a feature vector having the same number of dimensions as that of the feature vector 703. The feature vector 713 is then input to the fully-connected layer 704 trained in the processing 7A to calculate a classification probability 715. Then, a weight update unit 716 calculates a loss function 7161 with a one-hot vector of the ground truth data 707 for the face images 711. As the loss function 7161, cross entropy is similarly used. Results of the loss function 7161 are compiled for each batch that is one set of training data, and parameters of the CNN unit 712 are updated using the backpropagation method. The fully-connected layer 704 trained using one face image 701 is fixed and used, whereby the CNN unit 712 is trained so that the feature vector 713 calculated by the CNN unit 712 becomes a feature vector compatible with the feature vector 703 calculated by the CNN unit 702. Training the CNN unit 712 after sufficiently training the fully-connected layer 704 enables the CNN unit 712 to be trained so that respective portions of two face images 711 contributing to the identification are reflected in the feature vector 713. The training is affected by the arrangement order of the face images 711 at the time of connecting the face images 711. Thus, the training is performed while the order of the images to be input is changed, to prevent the training from being affected by the arrangement order. The CNN unit 712 trained at this time is used as the second feature vector calculation unit 205.

Figure 13:
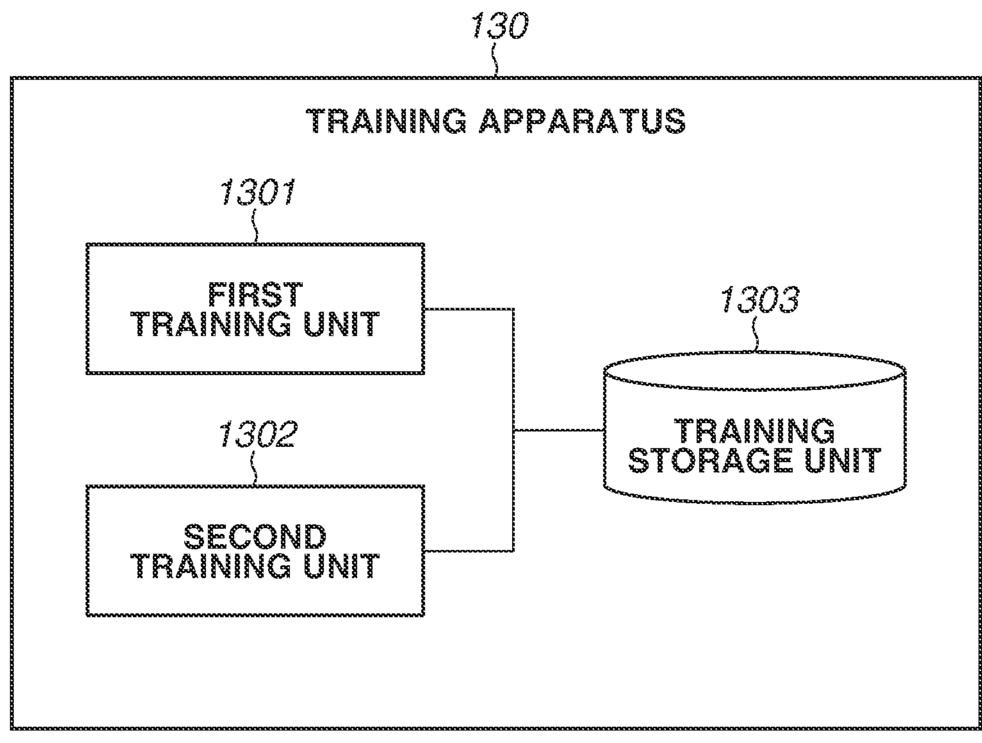
FIG. 13 is a block diagram illustrating an example of a functional configuration of a training apparatus according to the first exemplary embodiment.

The above-described training processing may be performed by the training apparatus 130 at a preparation stage before execution of the monitoring system. As illustrated in FIG. 13, the training apparatus 130 includes a first training unit 1301, a second training unit 1302, and a training storage unit 1303. The first training unit 1301 performs training processing in the processing 7A to train the CNN unit 702 and the fully-connected layer 704. In other words, the first training unit 1301 performs training processing on a first model for extracting a first feature vector from one image and a third model for extracting an intermediate vector from the first feature vector.

The second training unit 1302 performs training processing in the processing 7B to train the CNN unit 712 by using the fully-connected layer 704. In other words, the second training unit 1302 trains a second model for extracting a second feature vector from a plurality of images. At this time, the second training unit 1302 extracts the intermediate feature vector from the second feature vector by using the third model. The training storage unit 1303 stores parameters and the like of the models trained by the first training unit 1301 and the second training unit 1302.

As described above, in the present exemplary embodiment, one face image 701 is input at a time to train the CNN unit 702 and the fully-connected layer 704, and two face images 711 are input at a time to train the CNN unit 712 by using the trained fully-connected layer 704. As a result, the respective portions of the two face images 711 contributing to the identification are reflected in the feature vector 713. Further, the degree of similarity can be calculated by comparing the feature vector 703 obtained when one face image 701 is input and the feature vector 713 obtained when two face images 711 are input. By using these feature vectors, when one face image or two face images are registered, the identification processing can be performed using one face image or two face images.

In the present exemplary embodiment, in FIG. 7, one face image 701 is input at a time to the CNN unit 702, and two face images 711 are input at a time to the CNN unit 712. However, the number of face images is not limited thereto. The number of input images is changed when the CNN unit 702 is trained and when the CNN unit 712 is trained, whereby the other number of face images can be input. A plurality of CNN units corresponding to the number of input images can be prepared as the CNN unit 712 to handle the corresponding number of input images. When training using ten face images is performed, for example, six face images and four black-painted images can be input to train the CNN unit 712 to calculate the feature vector 713 in which the black-painted images are ignored and the six face images are valid. The CNN unit 712 is trained while the number of black-painted images is changed, whereby one CNN unit can calculate the feature vector in a case where up to ten face images are input.

In the first exemplary embodiment, a plurality of face images is input to the CNN unit 712 to calculate the feature vector 713. With this method, the number of input face images from which the feature vector 713 can be calculated depends on the number of face images input at the time of training. In a second exemplary embodiment, feature vectors are calculated respectively from a desired number of face images, and a feature vector obtained by integrating the calculated feature vectors is input to another CNN unit to calculate a feature vector. With this method, the number of input face images from which the feature vector can be calculated does not depend on the number of face images input at the time of training.

Figure 8:
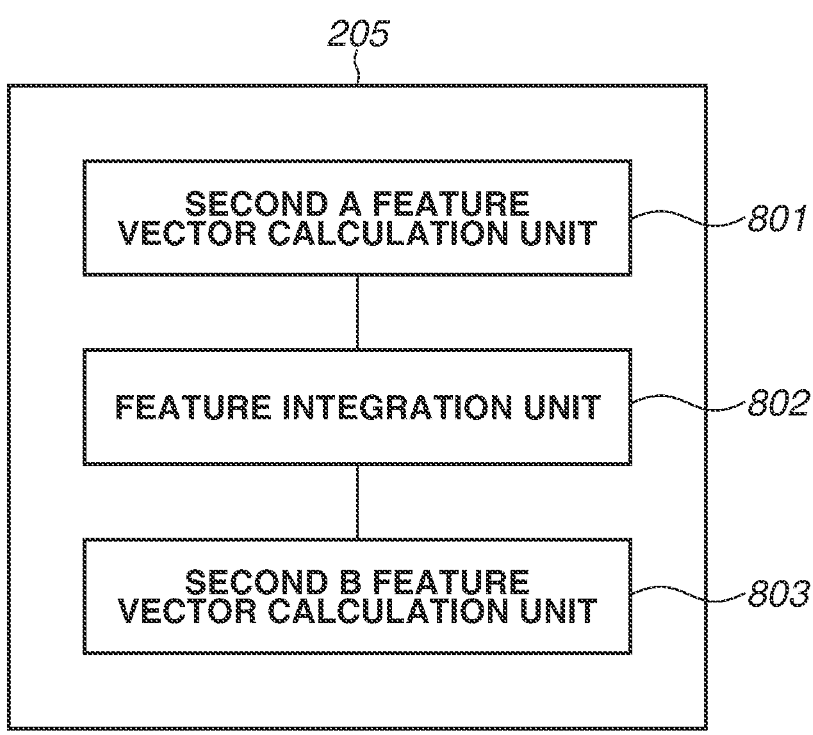
FIG. 8 is a block diagram illustrating an example of a detailed functional configuration of a second feature vector calculation unit according to a second exemplary embodiment.

In the following, the second exemplary embodiment of the present disclosure will be described. A functional configuration of the image processing apparatus 100 according to the present exemplary embodiment is basically similar to the functional configuration in FIG. 2 described in the first exemplary embodiment. However, the second feature vector calculation unit 205 has a subdivided configuration as illustrated in FIG. 8 in the present exemplary embodiment. An entire configuration of a monitoring system and a hardware configuration of the image processing apparatus 100 according to the present exemplary embodiment are similar to the configurations illustrated in FIG. 1. A description thereof will thus be omitted.

FIG. 8 is a block diagram illustrating an example of a detailed configuration of the second feature vector calculation unit 205 according to the present exemplary embodiment. The second feature vector calculation unit 205 includes a second A feature vector calculation unit 801 in a first stage, a feature integration unit 802, and a second B feature vector calculation unit 803 in a subsequent stage. Details of the functional units will be described below.

Figure 9:
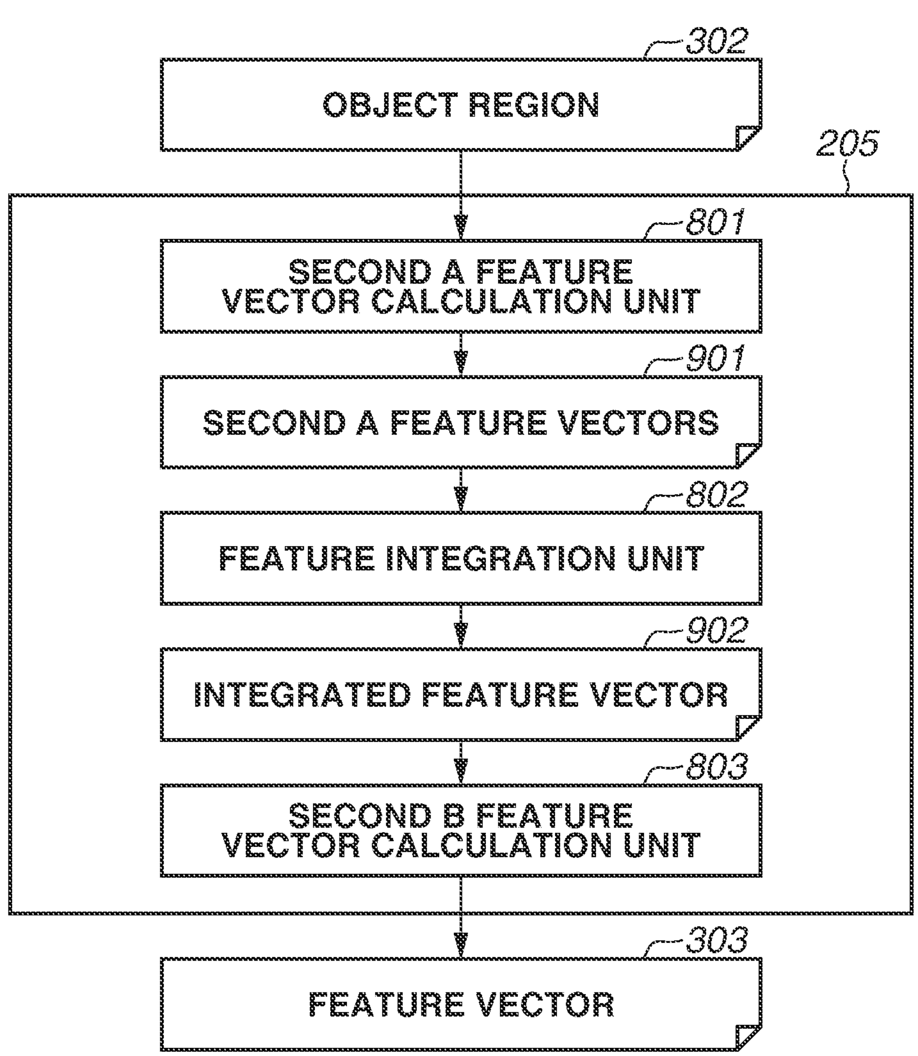
FIG. 9 is a diagram illustrating a processing procedure by the second feature vector calculation unit according to the second exemplary embodiment.

First, feature vector registration processing according to the present exemplary embodiment will be described. A procedure for the feature vector registration processing according to the present exemplary embodiment is basically similar to the procedure in the first exemplary embodiment, but the contents of the processing by the second feature vector calculation unit 205 in FIG. 3 are subdivided as illustrated in FIG. 9 in the present exemplary embodiment.

A plurality of object regions 302 detected from a plurality of images of the same person is input to the second feature vector calculation unit 205. First, the second A feature vector calculation unit 801 calculates a plurality of second A feature vectors 901 respectively for the object regions 302. An example of a method for training a model for calculating the second A feature vectors 901 will be described below. To calculate the feature vector 303 that collects features hardly affecting the authentication accuracy from the plurality of second A feature vectors 901, each of the second A feature vectors 901 desirably has the number of dimensions higher than the number of dimensions of the feature vector 303 that is finally obtained.

Then, the feature integration unit 802 integrates the plurality of second A feature vectors 901 to generate one integrated feature vector 902. When the plurality of second A feature vectors 901 is integrated, the maximum values in the respective dimensions among the values of the feature vectors obtained from the plurality of images for each position in a feature map are adopted and integrated. Adopting the maximum values makes it possible to generate the feature vector 303 that collects enhanced features. However, the values of the feature vectors are not limited to the maximum values, and intermediate values, average values, or N-th values from the largest may be adopted to generate the feature vector 303.

The integration method may be determined by some experiments.

In a case where the feature vectors are integrated for each dimension in the above-described manner, the number of dimensions of the second A feature vectors 901 and the number of dimensions of the integrated feature vector 902 are equal to each other. Alternatively, for example, after features near the second A feature vectors 901 may be averaged to reduce the number of dimensions, the maximum values in the respective dimensions may be adopted to generate the integrated feature vector 902. In this case, the number of dimensions of the integrated feature vector 902 is smaller than the number of dimensions of the second A feature vectors 901. In contrast, a plurality of features of the second A feature vectors 901 (e.g., two features from the largest) may be left for each dimension. In this case, the number of dimensions of the integrated feature vector 902 is greater than the number of dimensions of the second A feature vectors 901. This enables the feature integration unit 802 to be independent of the number of input feature vectors, and to be independent of the order of the input images.

Finally, the second B feature vector calculation unit 803 calculates the feature vector 303 in the form of final feature vector from the integrated feature vector 902. An example of a method for training a model for calculating the feature vector 303 will be described below.

Figure 10:
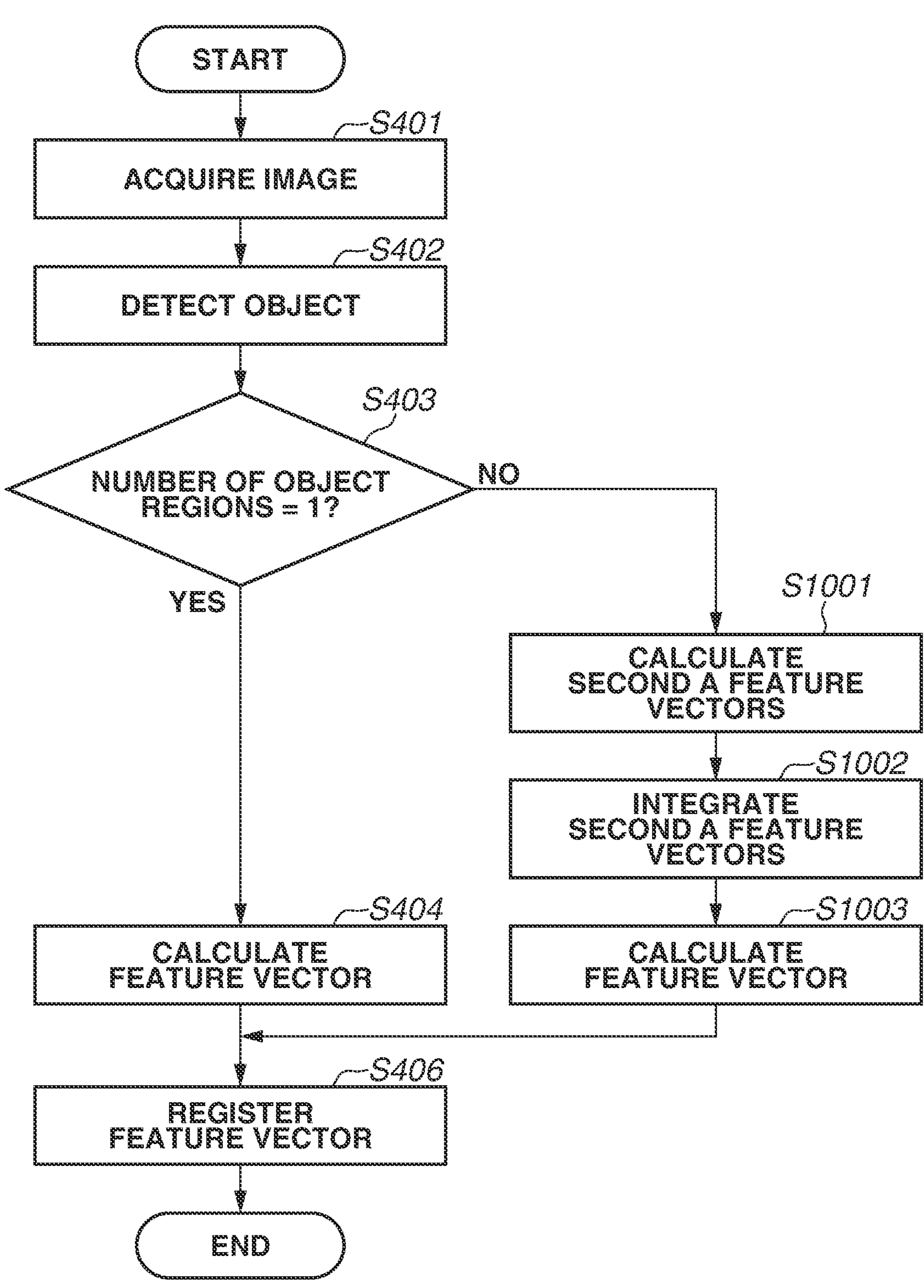
FIG. 10 is a flowchart illustrating an example of a procedure for feature vector registration processing according to the second exemplary embodiment.

Next, a specific processing procedure for the feature vector registration processing according to the present exemplary embodiment will be described with reference to a flowchart in FIG. 10. FIG. 10 is a flowchart illustrating an example of the procedure for the feature vector registration processing according to the present exemplary embodiment. Processing that is the same as the processing in the first exemplary embodiment is denoted by the same step numbers illustrated in FIG. 4, and a description of the processing will thus be omitted. Processing in steps S401 to S404 is similar to the processing in steps S401 to S404 in FIG. 4 described in the first exemplary embodiment, respectively. In a case where the selection unit 203 determines that the number of object regions 302 is plural (NO in step S403), the processing proceeds to step S1001.

In step S1001, the second A feature vector calculation unit 801 calculates the second A feature vectors 901 respectively for the object regions 302. In step S1002, the feature integration unit 802 integrates the plurality of second A feature vectors 901 to generate the integrated feature vector 902. In step S1003, the second B feature vector calculation unit 803 calculates the feature vector 303 from the integrated feature vector 902. Processing in step S406 is similar to the processing in step S406 in FIG. 4 described in the first exemplary embodiment.

Next, object identification processing according to the present exemplary embodiment will be described. A procedure for the object identification processing in the present exemplary embodiment is basically similar to the procedure in the first exemplary embodiment, but in the present exemplary embodiment, the contents of the processing by the second feature vector calculation unit 205 in FIG. 5 are subdivided as illustrated in FIG. 9. The details of the processing illustrated in FIG. 9 are as described above.

Figure 11:
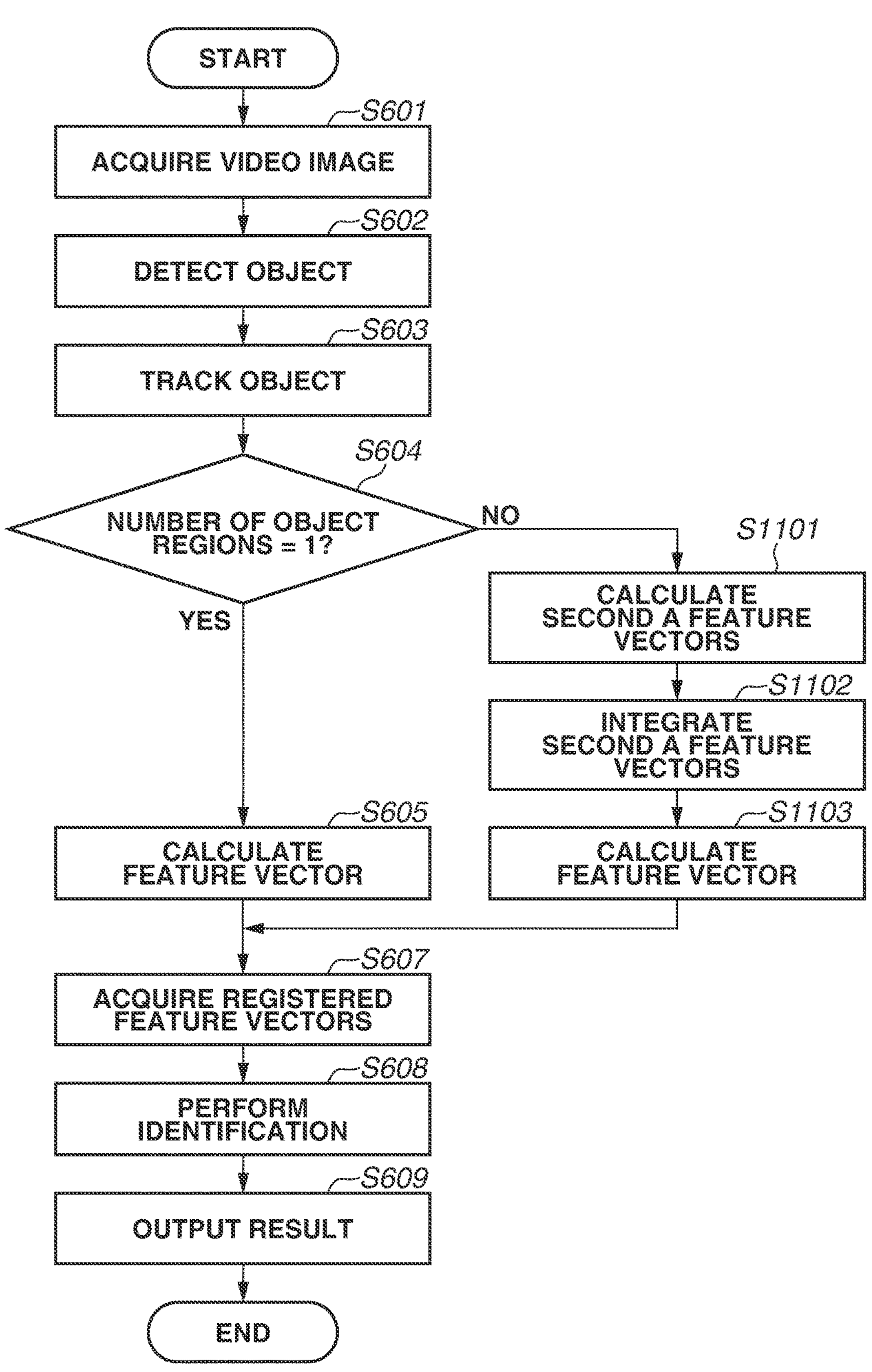
FIG. 11 is a flowchart illustrating an example of a procedure for object identification processing according to the second exemplary embodiment.

Next, a specific processing procedure for the object identification processing according to the present exemplary embodiment will be described with reference to a flowchart in FIG. 11. FIG. 11 is a flowchart illustrating an example of the procedure for the object identification processing according to the present exemplary embodiment. The processing that is the same as the processing in the first exemplary embodiment is denoted by the same step numbers illustrated in FIG. 6, and a description of the processing will thus be omitted. Processing in steps S601 to S605 is similar to the processing in steps S601 to S605 described in the first exemplary embodiment, respectively. In a case where the selection unit 203 determines that the number of object regions 302 is plural (NO in step S604), the processing proceeds to step S1101.

In step S1101, the second A feature vector calculation unit 801 calculates the second A feature vectors 901 respectively for the object regions 302. In step S1102, the feature integration unit 802 integrates the plurality of second A feature vectors 901 to generate the integrated feature vector 902. In step S1103, the second B feature vector calculation unit 803 calculates the feature vector 303 from the integrated feature vector 902. Processing in steps S607 to S609 is similar to the processing in steps S607 to S609 in FIG. 6 described in the first exemplary embodiment, respectively.

Next, the training processing on the first feature vector calculation unit 204 and the second feature vector calculation unit 205 according to the present exemplary embodiment will be described. The training method for the first feature vector calculation unit 204 according to the present exemplary embodiment is basically similar to the processing 7A in FIG. 7 described in the first exemplary embodiment, and a detailed description of the training method will thus be omitted. In the following, the training method for the second A feature vector calculation unit 802 and the second B feature vector calculation unit 803 of the second feature vector calculation unit 205 will be described.

Figure 12:
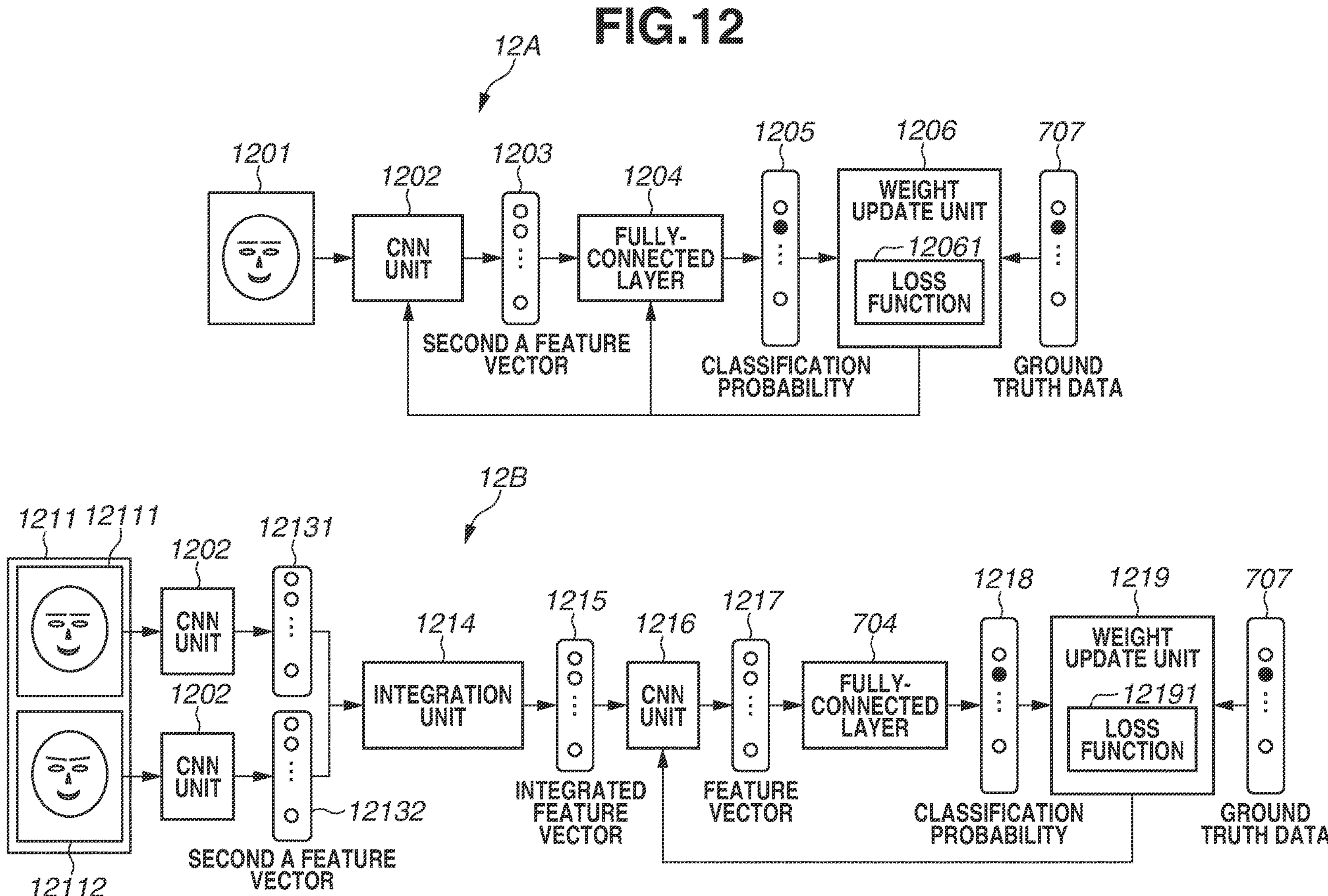
FIG. 12 is a diagram illustrating an example of training processing on the second feature vector calculation unit according to the second exemplary embodiment.

FIG. 12 is a diagram illustrating an example of the training processing on the second A feature vector calculation unit 801 and the second B feature vector calculation unit 803. Processing 12A in FIG. 12 is an example of training performed in a case where one face image 1201, among images such as an image in which a person's face is not facing forward, an image with out-of-focus blur or motion blur, and a low-resolution image, is input. On the other hand, processing 12B in FIG. 12 is an example in which a model trained by the processing 12A in FIG. 12 is used to learn feature vectors of a plurality of face images 1211 (face images 12111 and 12112) of the same person.

In the present exemplary embodiment, first, in the processing 7A in FIG. 7, the CNN unit 702 and the fully-connected layer 704 are simultaneously trained using one face image 701 in which features of a person are clearly captured. The CNN unit 702 trained at this time is used as the first feature vector calculation unit 204. In contrast, in the processing 12A in FIG. 12, a CNN unit 1202 and a fully-connected layer 1204 are simultaneously trained using one face image 1201 among images such as an image in which a person's face is not facing forward, an image with out-of-focus blur or motion blur, and a low-resolution image.

Then, in the processing 12B in FIG. 12, the CNN unit 1202 and the trained fully-connected layer 704 are fixed and used, and a CNN unit 1216 is trained using a desired number of the face images 1211.

It is assumed that the face image 1201 input in the processing 12A in FIG. 12 is normalized to the predetermined image size in advance as with the face image 701. The size of the normalized face image 1201 may be smaller than the size of the normalized face image 701. In the processing 12A, the face image 1201 is input to the CNN unit 1202 to calculate a second A feature vector 1203. Next, the second A feature vector 1203 is input to the fully-connected layer 1204 to calculate a classification probability 1205. Then, a weight update unit 1206 calculates a loss function 12061 with a one-hot vector of the ground truth data 707 for the face image 1201. As the loss function 12061, cross entropy is used. Results of the loss function 12061 are compiled for each batch that is one set of training data, and parameters of the CNN unit 1202 and the fully-connected layer 1204 are updated using the backpropagation method. The CNN unit 1202 trained at this time is used as the first A feature vector calculation unit 801.

On the other hand, it is assumed that the plurality of face images 1211 (the face images 12111 and 12112) input in the processing 12B is each normalized in advance to the size that is the same as that of the face image 1201.

In the processing 12B, a second A feature vector 12131 and a second A feature vector 12132 are calculated respectively from the plurality of face images 1211 (the face images 12111 and 12112) by using the CNN unit 1202 trained in the processing 12A. Then, based on the above-described method, an integration unit 1214 integrates the plurality of second A feature vectors 12131 and 12132 to generate an integrated feature vector 1215. Then, the integrated feature vector 1215 is input to the CNN unit 1216 to calculate a feature vector 1217.

The feature vector 1217 is then input to the fully-connected layer 704, which is trained in the processing 7A in FIG. 7, to calculate a classification probability 1218. Then, a weight update unit 1219 calculates a loss function 12191 with a one-hot vector of the ground truth data 707 for the face images 1211. As the loss function 12191, cross entropy is similarly used. Further, results of the loss function 12191 are compiled for each batch that is one set of training data, and parameters of the CNN unit 1216 are updated using the backpropagation method. The fully-connected layer 704 trained using one face image 701 is fixed and used, whereby the CNN unit 1216 is trained so that the feature vector 1217 calculated by the CNN unit 1216 becomes a feature vector compatible with the feature vector 703 calculated by the CNN unit 702. Training the CNN unit 1216 after sufficiently training the fully-connected layer 704 enables the CNN unit 1216 to be trained so that a portion of the integrated feature vector 1215 contributing to the identification is reflected in the feature vector 1217. The CNN unit 1216 trained at this time is used as the second B feature vector calculation unit 803.

In the present exemplary embodiment, the training performed in a case where two face images are input at a time is described, but the identification processing can be performed using any number of face images because the number of face images is adjusted by the feature integration unit 802. Accordingly, performing the training while changing the number of input images in the processing 12B in FIG. 12 makes it possible to perform the training that is robust against the number of input images.

As described above, in the present exemplary embodiment, feature vectors are calculated respectively from a plurality of face images, and a feature vector obtained by integrating the calculated feature vectors is input to another CNN unit to calculate a feature vector. As a result, the respective portions of the plurality of face images contributing to the identification are reflected in the feature vector. Further, with this method, the feature vector can be calculated in such a manner that the number of input face images from which the feature vector can be calculated is independent of the number of face images input at the time of training. The degree of similarity can be compared between the feature vector obtained when one face image is input and the feature vector obtained when the plurality of face images is input. By using these feature vectors, when one face image or a plurality of face images is registered, the identification can be performed using one face image or a plurality of face images.

According to the exemplary embodiments of the present disclosure, even when the image to be collated has low quality, the collation can be performed with high accuracy.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-003679, filed Jan. 13, 2023, which is hereby incorporated by reference herein in its entirety.

What is claimed is:

1. An image recognition apparatus that identifies an object in an image, the image recognition apparatus comprising:

at least one memory storing instructions; and at least one processor that, upon execution of the instructions, is configured to operate as:

a first calculation unit configured to calculate a first feature vector from a first image including the object by using a first model;

a second calculation unit configured to calculate a second feature vector from second images by using a second model, wherein a number of the second images is greater than a number of the first image used by the first calculation unit, and wherein a quality of at least one of the second images is lower than the first image; and an identification unit configured to compare the first feature vector and the second feature vector to determine if an object in the second images is a same object as an object in the first image;

wherein the second calculation unit includes a third calculation unit configured to calculate third feature vectors respectively from the second images by using a fourth model, an integration unit configured to integrate the third feature vectors calculated respectively by the third calculation unit to generate an integrated feature vector, and a fourth calculation unit configured to calculate the second feature vector from the integrated feature vector generated by the integration unit, by using the second model.

2. The image recognition apparatus according to claim 1, wherein the second model is a model trained using a third model that is trained based on the first feature vector.

3. The image recognition apparatus according to claim 2, wherein each of the first model and the third model is a model trained based on a result obtained by extracting the first feature vector from one image and inputting the first feature vector to the third model, and wherein the second model is a model trained based on a result obtained by extracting the second feature vector from a plurality of images and inputting the second feature vector to the third model.

4. The image recognition apparatus according to claim 1, wherein the second model is a model trained using the integrated feature vector generated by the integration unit as an input and using a third model trained based on the first feature vector.

5. The image recognition apparatus according to claim 1, further comprising a tracking unit configured to detect and track the object in a video image, wherein the second images are an image included in the video image in which the object is tracked by the tracking unit.

6. The image recognition apparatus according to claim 1, wherein the first image is higher in resolution than the second images.

7. The image recognition apparatus according to claim 1, wherein the second images are images with out-of-focus blur or motion blur.

8. The image recognition apparatus according to claim 1, wherein the object is a person's face, and wherein the first image and the second images are each an image of the person's face.

9. The image recognition apparatus according to claim 5, wherein the object is a person's face, and wherein the first image is an image in which the person's face is facing forward, and the second images are an image in which the person's face is not facing forward.

10. A training apparatus comprising:

at least one memory storing instructions; and at least one processor that, upon execution of the instructions, is configured to operate as:

a first training unit configured to perform, based on a first intermediate feature vector and ground truth data, training processing on a first model for extracting a first feature vector of an object within one image and training processing on a third model for extracting the first intermediate feature vector from the first feature vector; and a second training unit configured to perform, based on a second intermediate feature vector and ground truth data, training processing on a second model for extracting a second feature vector of an object based on each of a plurality of images, wherein the second training unit includes:

a third calculation unit configured to calculate third feature vectors respectively from the plurality of images by using a fourth model;

an integration unit configured to integrate the third feature vectors calculated respectively by the third calculation unit to generate an integrated feature vector; and a fourth calculation unit configured to calculate the second feature vector from the integrated feature vector generated by the integration unit, by using the second model, wherein the second intermediate feature vector is extracted from the second feature vector by using the third model, and wherein the trained first and second models are used to extract a feature vector of an object within an image for object recognition.

11. A method for controlling an image recognition apparatus that identifies an object in an image, the method comprising:

calculating a first feature vector from a first image including the object by using a first model;

calculating a second feature vector from second images by using a second model, wherein a number of the second images is greater than a number of the first image, and wherein a quality of at least one of the second images is lower than the first image;

wherein calculating the second feature vector comprises:

calculating third feature vectors respectively from the second images by using a fourth model;

integrating the third feature vectors to generate an integrated feature vector; and calculating the second feature vector from the integrated feature vector by using the second model; and comparing the first feature vector and the second feature vector to determine if an object in the second images is a same object as an object in the first image.

12. A non-transitory computer-readable storage medium that stores a program for causing a computer to execute a method for controlling an image recognition apparatus that identifies an object in an image, the method comprising:

calculating a first feature vector from a first image including the object by using a first model;

calculating a second feature vector from second images by using a second model, wherein a number of the second images is greater than a number of the first image, and wherein a quality of at least one of the second images is lower than the first image;

wherein calculating the second feature vector comprises:

calculating third feature vectors respectively from the second images by using a fourth model;

integrating the third feature vectors to generate an integrated feature vector; and calculating the second feature vector from the integrated feature vector by using the second model; and comparing the first feature vector and the second feature vector to determine if an object in the second images is a same object as an object in the first image.

13. The training apparatus according to claim 10, wherein parameters of the third model are fixed during the training processing on the second model.

* * * * *